(12) United States Patent
Fujiwara et al.

(10) Patent No.: US 7,140,205 B2
(45) Date of Patent: Nov. 28, 2006

(54) METHOD OF MANUFACTURING GLASS OPTICAL ELEMENTS

(75) Inventors: Yasuhiro Fujiwara, Akishima (JP); Zou Xuelu, Akishima (JP); Hiroyuki Sakai, Tokyo (JP); Shinichiro Hirota, Fuchu (JP)

(73) Assignee: Hoya Corporation, Tokyo (JP)

( * ) Notice: Subject to any disclaimer, the term of this patent is extended or adjusted under 35 U.S.C. 154(b) by 351 days.

(21) Appl. No.: 10/387,454

(22) Filed: Mar. 14, 2003

(65) Prior Publication Data

US 2003/0209035 A1 Nov. 13, 2003

(30) Foreign Application Priority Data

Mar. 14, 2002 (JP) ............................. 2002-070781
Mar. 28, 2002 (JP) ............................. 2002-092666

(51) Int. Cl.
*C03B 11/02* (2006.01)

(52) U.S. Cl. .................. 65/64; 65/24; 65/26; 65/63; 65/102

(58) Field of Classification Search ............... 65/24, 65/26, 63, 64, 102, 169, 170; 501/45, 46, 501/47

See application file for complete search history.

(56) References Cited

U.S. PATENT DOCUMENTS

| 5,873,921 A * | 2/1999 | Hirota et al. ................ 65/25.1 |
| 2002/0042337 A1 * | 4/2002 | Zou et al. ..................... 501/45 |
| 2002/0073735 A1 * | 6/2002 | Hayashi et al. ............... 65/32.1 |

FOREIGN PATENT DOCUMENTS

| JP | 62-207726 A | 9/1987 |
| JP | 07-010556 A | 1/1995 |
| JP | 08-119639 A | 5/1996 |
| JP | 08-157231 A | 6/1996 |
| JP | 08-259241 A | 10/1996 |
| WO | WO 0202470 | 1/2002 |

* cited by examiner

*Primary Examiner*—Sean Vincent
(74) *Attorney, Agent, or Firm*—Sughrue Mion, PLLC

(57) ABSTRACT

Disclosed is a method of manufacturing ultraprecise lenses, including aspherical lenses, not requiring grinding or polishing after press molding. The method comprises heating a glass material to a temperature corresponding to a glass viscosity of from $10^5$ to $10^9$ dPaS so that the glass material is softened, and press molding the glass material with the pressing molds which are heated to a temperature corresponding to a glass viscosity of from $10^8$ to $10^{12}$ dPaS. Provided that the glass material is not heated to a temperature as high as that corresponding to a glass viscosity of $10^5$ dPaS when the pressing mold is heated to a temperature corresponding to a glass viscosity of $10^8$ and that the glass material is not heated to a temperature as low as that corresponding to a glass viscosity of $10^9$ dPaS when the pressing mold is heated to a temperature corresponding to a glass viscosity of $10^{12}$ dPaS. The glass material to be molded comprises at least one selected from the group consisting of $Nb_2O_3$, $WO_3$, and $TiO_2$ and has a refractive index nd of greater than or equal to 1.65, an Abbè number (ν d) of less than or equal to 35, and a sag point (Ts) of less than or equal to 570° C. Each of the pressing molds comprises a film comprising carbon on a molding surface.

17 Claims, 3 Drawing Sheets

| | | Pressing mold | | | | | | |
|---|---|---|---|---|---|---|---|---|
| | Temperature (°C) | 440 | 450 | 470 | 490 | 510 | 530 | 555 |
| Temperature (°C) | Glass viscosity (dPaS) | $10^{13}$ | $10^{12}$ | $10^{11}$ | $10^{10}$ | $10^{9.0}$ | $10^{8.0}$ | $10^{7.0}$ |
| 660 | $10^{4.0}$ | | | Radial line marks | | | | Bubbling |
| 620 | $10^{5.0}$ | | | | Good Slight radial line marks | | | |
| 580 | $10^{6.0}$ | Defective extension | Good Slow deformation | Good | Good Slight radial line marks | Radial line marks |
| 555 | $10^{7.0}$ | | | | | | | |
| 530 | $10^{8.0}$ | | | | | | | |
| 510 | $10^{9.0}$ | | Good Slow deformation | | | |
| 490 | $10^{10}$ | Cracking | Defective extension | | | |

Figure 2

| | | Pressing mold | | | | | | |
|---|---|---|---|---|---|---|---|---|
| | Temperature (°C) | 460 | 480 | 500 | 520 | 540 | 560 | 605 |
| Temperature (°C) | Glass viscosity (dPaS) | $10^{13}$ | $10^{12}$ | $10^{11}$ | $10^{10}$ | $10^{9.0}$ | $10^{8.0}$ | $10^{7.0}$ |
| 700 | $10^{4.0}$ | | Radial line marks | | | | | Bubbling |
| 660 | $10^{5.0}$ | | | Good Slight radial line marks | | | Radial line marks | |
| 620 | $10^{6.0}$ | Defective extension | Good Slow deformation | Good | | | Good Slight radial line marks | Radial line marks |
| 590 | $10^{7.0}$ | | | | | | | |
| 560 | $10^{8.0}$ | | | | | | | |
| 540 | $10^{9.0}$ | | Defective extension | Good Slow deformation | | | | |
| 520 | $10^{10}$ | Cracking | Defective extension | | | | | |

Preform (row label)

Figure 3

| | | Pressing mold | | | | | | |
|---|---|---|---|---|---|---|---|---|
| | Temperature (°C) | 440 | 450 | 470 | 490 | 510 | 530 | 555 |
| Temperature (°C) | Glass viscosity (dPaS) | $10^{13}$ | $10^{12}$ | $10^{11}$ | $10^{10}$ | $10^{9.0}$ | $10^{8.0}$ | $10^{7.0}$ |
| 660 | $10^{4.0}$ | | Radial line marks | | | | | Bubbling |
| 620 | $10^{5.0}$ | Defective extension | Good / Slight radial line marks | | | | | Radial line marks |
| 580 | $10^{6.0}$ | Defective extension | Good / Slow deformation | Good | | | Good / Slight radial line marks | Radial line marks |
| 555 | $10^{7.0}$ | Defective extension | Good / Slow deformation | Good | | | Good / Slight radial line marks | Radial line marks |
| 530 | $10^{8.0}$ | Defective extension | Good / Slow deformation | Good | | | Good / Slight radial line marks | Radial line marks |
| 510 | $10^{9.0}$ | | Good / Slow deformation | | | | | |
| 490 | $10^{10}$ | Cracking | Defective extension | | | | | |

(Preform on vertical axis)

METHOD OF MANUFACTURING GLASS OPTICAL ELEMENTS

TECHNICAL FIELD

The present invention relates to a method of manufacturing ultraprecise lenses, including aspherical lenses, not requiring grinding or polishing after press molding.

BACKGROUND OF THE INVENTION

In recent years, the need for optical elements employing high-refractive-index, high-dispersion glass has increased immensely. Such glass optical elements are extremely important optical components in the optical systems of cameras and digital cameras, in particular. Further, methods of molding aspherical lenses and the like by precision pressing of high-refractive-index, high-dispersion glass without grinding or polishing are required. For example, Japanese Unexamined Patent Publication (KOKAI) Heisei No. 7-10556 describes temperature ranges for a pressing mold and glass material that are suited to precision pressing.

Examples of known high-refractive-index, high-dispersion glass are described in Japanese Unexamined Patent Publications (KOKAI) Heisei No. 1-308843 and Showa No. 62-3103. However, these glasses contain a large amount of PbO. Thus, they are undesirable from an environmental perspective, and present a further problem in that lead is reduced in the molding chamber during the press molding of optical components, precipitating out into the pressing mold. Due to the relatively high sag point of these glass gobs, the molding temperature must be raised. Thus, there is a problem of deterioration of the mold material during molding and a problem of crystals precipitating in the glass during molding.

Further, Japanese Unexamined Patent (KOKAI) Publication No. 2001-58845 discloses a high-refractive-index, high-dispersion glass with a refractive index (nd) equal to or greater than 1.83 and an Abbé number (vd) of less than or equal to 26. However, when this glass is heated to a temperature suited to press molding, components tending to reduce ($Nb_2O_5$, $WO_3$, $TiO_2$) react at the mold surface, causing problems by damaging the release film applied on the mold surface, generating bubbles on the surface of the glass material, and producing radial line marks on the surface of the element following pressing. Accordingly, the satisfactory quality of lens is not necessarily obtained.

Accordingly, the object of the present invention is to provide a method of manufacturing glass optical elements by press molding high-refractive-index, high-dispersion glass without damaging the release film applied on the mold surface, without generating bubbles on the glass material surface, and without generating radial line marks on the optical element surface, while preventing cracking during molding.

SUMMARY OF THE INVENTION

The present invention relates to a method of manufacturing glass optical elements with a pair of opposed pressing molds, comprising;

heating a glass material to a temperature corresponding to a glass viscosity of from $10^5$ to $10^9$ dPaS so that the glass material is softened, press molding the glass material with the pressing molds which are heated to a temperature corresponding to a glass viscosity of from $10^8$ to $10^{12}$ dPaS, wherein the glass material comprises at least one selected from the group consisting of $Nb_2O_3$, $WO_3$, and $TiO_2$ and has a refractive index nd of greater than or equal to 1.65, an Abbè number (v d) of less than or equal to 35, and a sag point (Ts) of less than or equal to 570° C., and each of the pressing molds comprises a film comprising carbon on a molding surface;

provided that the glass material is not heated to a temperature as high as that corresponding to a glass viscosity of $10^5$ dPaS when the pressing mold is heated to a temperature corresponding to a glass viscosity of $10^8$ and that the glass material is not heated to a temperature as low as that corresponding to a glass viscosity of $10^9$ dPaS when the pressing mold is heated to a temperature corresponding to a glass viscosity of $10^{12}$ dPaS.

In the manufacturing method of the present invention, it is preferred that the glass material further comprises at least one selected from the group consisting of $P_2O_5$, $SiO_2$, and $B_2O_3$, and the sum of the contents of $Nb_2O_3$, $WO_3$, and $TiO_2$, denoted as $C_H$, satisfies the condition of $0<C_H<35$ in molar percent, and that the glass material is heated to a temperature corresponding to a glass viscosity of from $10^6$ to $10^8$ dPaS, and that the pressing molds are heated to a temperature corresponding to a glass viscosity of from $10^9$ to $10^{11}$ dPaS.

In the manufacturing method of the present invention, the glass material preferably comprises, in molar percentage,

| | |
|---|---|
| $P_2O_5$ | 15–40 percent, |
| $SiO_2$ | 0–10 percent, |
| $B_2O_3$ | 0–20 percent, |
| $Al_2O_3$ | 0–5 percent, |
| $Li_2O$ | 5–30 percent, |
| $Na_2O$ | 0–30 percent, |
| ZnO | 0–20 percent, |
| BaO | 0–20 percent, |
| $Nb_2O_5$ | 2–30 percent, |
| $WO_3$ | 2–15 percent, and |
| $TiO_2$ | 0–15 percent | where the total amount of $NbO_2$, $WO_3$, and $TiO_2$ is greater than or equal to 10 percent and less than 35 percent and the total amount of the above listed components is greater than or equal to 95 percent.

In the manufacturing method of the present invention, it is preferred that the press molding is conducted in a non-oxidizing atmosphere and the glass material is coated with a film comprising carbon.

BRIEF DESCRIPTION OF THE FIGURES

FIG. 2 gives the temperatures of the preform and the molds at feeding of the preform and the glass viscosities corresponding to those temperatures, and the results of evaluation of the lens obtained by press molding in Example 1.

FIG. 3 gives the temperatures of the preform and the molds at feeding of the preform and the glass viscosities corresponding to those temperatures, and the results of evaluation of the lens obtained by press molding in Example 2.

BEST MODE OF IMPLEMENTING THE INVENTION

Figure 1:
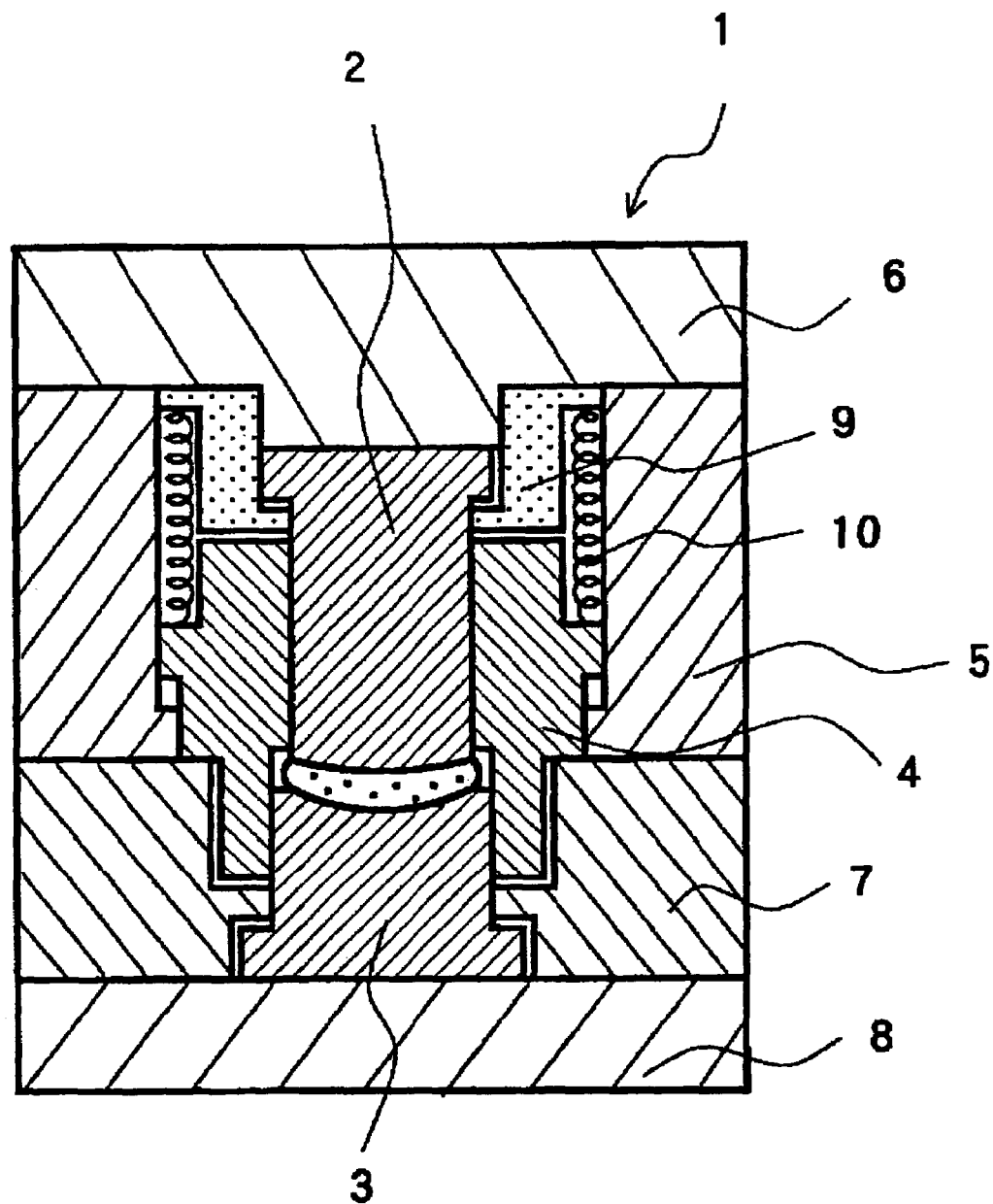
FIG. 1 is a schematic of the press molding apparatus employed in precision press molding.

The present inventors conducted extensive research into solving the above-stated problems, resulting in the following discoveries.

The incorporation of components such as $Nb_2O_5$, $WO_3$, and $TiO_2$ into glass achieves a high refractive index and high dispersion characteristics. However, during the press molding of glass containing such components, radial line marks tend to appear on the lens surface and bubbles tend to develop. This is attributed to a reaction occurring at the interface with the mold during the molding step due to the tendency of these components to reduce. Further, when a carbon-based film is applied to the surface of the mold or the glass material to improve the release properties of the press molded lens from the pressing mold, these components are thought to react with the carbon-based film, generating radial line marks and bubbles.

Providing a carbon-based release film on the molding surface of the pressing mold is extremely effective because it inexpensively yields good mold release properties. However, when a pressing mold having such a release film is used to press mold a high-refractive-index, high-dispersion glass such as that described above, a reaction has been found to occur at the interface between the mold surface and the glass, tending to generate radial line marks.

Further, such high-refractive-index, high-dispersion glass materials tend to crack. When the pressing temperature is reduced to prevent the above-described reaction at the molding surface, the tendency to crack during molding increases.

Accordingly, based on the above discoveries, the present inventors conducted extensive research into the temperature ranges of the pressing mold and glass material during press molding, resulting in the discovery of conditions for manufacturing glass optical elements suited to precision press molding without the problems of radial line marks, bubbling, and the like; the present invention was devised on this basis.

That is, the manufacturing method of the present invention is characterized by comprising a step wherein a glass material, after having been heated to a temperature corresponding to a glass viscosity of from $10^5$ to $10^9$ dPaS, is press molded with said pressing molds after said pressing molds have been heated to a temperature corresponding to a glass viscosity of from $10^8$ to $10^{12}$ dPaS. However, the case where the glass material has been heated to a temperature corresponding to $10^5$ dPaS and the pressing mold has been heated to a temperature corresponding to $10^8$ dPaS and the case where the glass material has been heated to a temperature corresponding to $10^9$ dPaS and the pressing mold has been heated to a temperature of $10^{12}$ dPaS are excluded because, as indicated in the examples, the effect of the present invention is not sufficient.

In the present Specification, unless specifically indicated otherwise, a glass viscosity of $10^n$ dPaS denotes a range of greater than or equal to $0.5 \times 10^n$ dPaS and less than $5 \times 10^n$ dPaS.

In the manufacturing method of the present invention, a glass material that has been softened by heating is press molded in a heated pressing mold. The glass material is desirably first heated to a prescribed temperature outside the mold and introduced into a mold that has been heated to a prescribed temperature, with press molding beginning immediately.

When the mold temperature at the start of press molding is less than the temperature corresponding to a glass viscosity of $10^{12}$ dPaS, the shape of the molded article could not be satisfactory because the shape of mold surface is not transferred with the glass material fully extended, and cracking tends to occur because deformation of the glass material does not occur properly. Further, when the temperature of the glass material is less than the temperature corresponding to a glass viscosity of $10^9$ dPaS, the same problems as those set forth above occur. Further, when the mold temperature exceeds the temperature corresponding to a glass viscosity of $10^8$ dPaS, or the temperature of the glass material exceeds the temperature corresponding to a glass viscosity of $10^5$ dPaS, molding is possible but radial line marks are imparted to the optical element or bubbling occurs, sometimes resulting in defective surface precision of the glass element or a defective external appearance. The present inventors have discovered that such bubbling and radial line marks have a strong tendency to occur in the high-refractive-index, high-dispersion glass material employed in the present invention.

That is, in the present invention, since surface reactivity is high during molding (particularly when there are fairly high amount of components tending to reduce) due to the incorporation of high-refractive-index, high-dispersion components into the glass material, radial line marks and bubbling tend to occur during pressing of the glass material. However, specifying the heat ranges of the glass material and pressing mold as set forth above yields glass optical elements in the form of lenses with good shape precision and surface precision without problems such as those set forth above.

As stated above, the effect of the present invention is not sufficient when the glass material is at a temperature corresponding to $10^5$ dPaS and the pressing mold is at a temperature corresponding to $10^8$ dPaS, or when the glass material is at a temperature corresponding to $10^9$ dPaS and the pressing mold is at a temperature corresponding to $10^{12}$ dPaS. Accordingly, with this in mind, and considering the effects exhibited in the examples, a glass material heated to a temperature corresponding to a glass viscosity of from $10^6$ to $10^8$ dPaS and a pressing mold heated to a temperature corresponding to a glass viscosity of from $10^9$ to $10^{11}$ dPaS are preferably employed in the press molding step. Further, conducting press molding with a glass material at a temperature corresponding to a glass viscosity of from $1 \times 10^6$ to $1 \times 10^8$ dPaS and a pressing mold at a temperature corresponding to a glass viscosity of greater than or equal to $1 \times 10^9$ dPaS and less than $1 \times 10^{10}$ dPaS affords the advantage of shortening the molding cycle, and yields optical elements of good quality in which bubbling and line marks are inhibited during molding.

When a glass material and/or press mold that has been heated to within these temperature ranges is employed, glass optical elements with good quality, without radial line marks, and with good productivity are obtained because a desired thickness is achieved quickly during pressing. Within the above-stated ranges, the temperature of the glass material and the pressing mold can be suitably selected based on the shape of the optical element being molded. For example, for shapes tending to crack, such as convex lenses having a flat surface area along the perimeter, the mold temperature can be raised to a temperature corresponding to a glass viscosity of from $5 \times 10^7$ to $1 \times 10^9$ dPaS, and the glass material temperature can correspond to a glass viscosity of from $1 \times 10^6$ to $1 \times 10^8$. The temperature difference between the glass material and the mold can be made from about 10 to 70° C.

The glass material employed in the present invention will be described below.

The glass material employed in the present invention is comprised of glass having a refractive index (nd) of greater than or equal to 1.65, an Abbé number (vd) of less than or equal to 35, and a sag point (Ts) of less than or equal to 570° C. The glass preferably has a refractive index (nd) of greater than or equal to 1.68. There is no upper limit to the refractive index (nd) of the glass, but in practical terms, the refractive index (nd) of the glass is less than or equal to about 2.0, preferably less than 1.83.

The glass preferably has an Abbé number (vd) of less than or equal to 33, preferably less than or equal to 32. There is no lower limit to the Abbé number (vd) of the glass, but in practical terms, the Abbé number (vd) of the glass is greater than or equal to 20. The preferred range for the sag point (Ts) will be described further below.

The glass material employed in the present invention may be a phosphate, silicate, or borate-based glass, or some mixture thereof. At least one high-refractive-index, high-dispersion component selected from the group consisting of $Nb_2O_5$, $WO_3$, and $TiO_2$ is incorporated. When the sum of the contents of $Nb_2O_5$, $WO_3$, and $TiO_2$ is denoted as $C_H$ (molar percent), $0<C_H<35$ is desirable, and $0<C_H<32$ is preferred. When $C_H$ is less than 35 molar percent, the readily reducing components in the glass, such as Nb, W, and Ti, hardly reduce within the temperature range in which pressing is permitted, whereby removing the risk of the glass developing color. Even when a carbon-based film is coated on the surfaces of the pressing mold or the glass material to improve mold release properties, the film and the glass material surface hardly react and the optical element is hardly damaged.

The sag point (Ts) of the glass material is less than or equal to 570° C. When $WO_3$ is incorporated as a high-refractive-index, high-dispersion component and the content of $WO_3$ is denoted by Cw (molar percent), it is preferred that $Ts \leq 570°$ C. and $Ts+7C_w \leq 610$. $WO_3$ is preferably from 2 to 15 molar percent and, while satisfying the above-stated relation, it is preferable for $Ts+6C_w \leq 590$. In glass materials in which the sag point exceeds 570° C., the press temperature is comparatively high. Thus, during pressing, defects such as bubbles, radial line marks, and lumps could remain, precluding the obtaining of good quality lenses. Accordingly, it is necessary to employ a glass material with a sag point of less than or equal to 570° C. The sag point is preferably less than or equal to 550° C., and more preferably less than or equal to 540° C. At $Ts+7C_w>610$, the W (tungsten) in the glass, a component with a substantial tendency to reduce, reacts with the surface of the press mold in the temperature range within which pressing is permitted, tending to damage the optical element being molded. Thus, $Ts+7C_w \leq 610$ is desirable. Preferably, while satisfying the above relation, $Ts+6C_w \leq 590$. When the $WO_3$ content is less than 2 molar percent, the exceedingly low quantity of $WO_3$ means that the possibility of the sag point $Ts>570°$ C. increases, and the stability of the glass decreases. Thus, while maintaining $Ts+7C_w \leq 610$, the content of $WO_3$ is preferably increased to greater than or equal to 2 percent. When the $WO_3$ content exceeds 15 molar percent, the quantity of $WO_3$ is excessive and there is a risk of the glass developing color. Thus, while maintaining the condition, $Ts+7C_w \leq 610$, the $WO_3$ content is preferably kept to less than or equal to 15 percent. Within the above-stated ranges, the relation $Ts+6C_w \leq 590$ is preferred, with a $WO_3$ content ranging from 2 to 12 percent. More preferably, the relation of $Ts+6C_w \leq 580$ is met.

Specifically, the glass material preferably comprises, denoted as molar percentages:

| | |
|---|---|
| $P_2O_5$ | 15–40 percent, |
| $SiO_2$ | 0–10 percent, |
| $B_2O_3$ | 0–20 percent, |
| $Al_2O_3$ | 0–5 percent, |
| $Li_2O$ | 5–30 percent, |
| $Na_2O$ | 0–30 percent, |
| ZnO | 0–20 percent, |
| BaO | 0–20 percent, |
| $Nb_2O_5$ | 2–30 percent, |
| $WO_3$ | 2–15 percent, and |
| $TiO_2$ | 0–15 percent | where the total quantity of $Nb_2O_5$, $WO_3$, and $TiO_2$ is greater than or equal to 10 percent and less than 35 percent and the total quantity of the above-listed components is greater than or equal to 95 percent. The proportions of these components will be described below. The content of each of these components is denoted as a molar percentage unless specifically indicated otherwise.

$P_2O_5$ is incorporated into the above glass material as an essential component. $P_2O_5$ forms the network structure of the glass and imparts manufacturing stability to the glass. However, when the quantity of $P_2O_5$ exceeds 40 percent, the glass transition temperature and sag point of the glass increase, the refractive index decreases, and the Abbé number tends to increase. By contrast, at less than 15 percent, the glass has a strong tendency to devitrify and becomes unstable. Thus, the $P_2O_5$ content falls preferably within a range of 15 to 40 percent, more preferably within a range of 17 to 37 percent.

$B_2O_3$, desirably comprised in the above glass material as an essential component, is an extremely effective component for improving the meltability of the glass and achieving homogeneity in the glass. At the same time, incorporating a small quantity of $B_2O_3$ changes the bonding property of the OH in the glass and is extremely useful in inhibiting bubbling of the glass during pressing. However, when the quantity of $B_2O_3$ exceeds 20 percent, glass in which a large amount of $Nb_2O_5$ has been introduced to maintain a high refractive index becomes unstable. Thus, the quantity incorporated is desirably kept to less than or equal to 20 percent, preferably within a range of 1 to 15 percent.

$SiO_2$ functions to form the network structure of the glass like $P_2O_5$, improve the durability and stability of the glass, and increase the viscosity of the glass at the liquid phase temperature. It is desirably incorporated into the glass material as an essential component. However, when more than 10 percent of $SiO_2$ is incorporated into glass containing large amounts of high-refractive-index components, such as $WO_3$ and $Nb_2O_5$, (1) the glass tends to crystallize, (2) the refractive index decreases substantially, (3) the glass tends not to melt, and (4) the sag point and liquid phase temperature increase. Thus, the quantity incorporated is desirably kept to 10 percent or less, preferably 8 percent or less.

$Nb_2O_5$ is an extremely important component that is essential for imparting characteristics such as a high refractive index and high dispersion to the glass when PbO is not employed. However, when the quantity incorporated exceeds 30 percent, the glass transition temperature and sag point increase, stability deteriorates, high-temperature meltability deteriorates, and the glass tends to develop bubbles and color during precision pressing. Further, when the quantity incorporated is less than 2 percent, the glass refractive index drops and dispersion decreases. Thus, the preferred quantity of $Nb_2O_5$ incorporated suitably falls within a range of 2 to 30 percent, more preferably within a range of 5 to 25 percent.

$WO_3$ is an important component in the above-described glass material, permitting a low melting point without the use of PbO and imparting a high refractive index and high dispersion characteristics to the glass. It is the most effective component. $WO_3$ functions to reduce the transition temperature and sag point of the glass in the same manner as alkali metal oxides, as well as raising the refractive index. However, when an excessive quantity of $WO_3$ is incorporated, such as a quantity of 15 percent, the glass tends to develop color and the viscosity of the glass at high temperature decreases, making it difficult to manufacture a glass preform for precision pressing. By contrast, at less than 2 percent, the glass transition temperature and sag point increase and the glass tends to bubble during precision pressing. Accordingly, the incorporation of a quantity falling within a range of from 2 to 15 percent is desirable, with a range of from 2 to 12 percent being preferred.

$TiO_2$ has the effects of increasing the refractive index of the glass and improving devitrification stability. However, when the content exceeds 15 percent, the devitrification stability of the glass deteriorates sharply, the sag point and liquid phase temperature both increase sharply, and the glass tends to develop color during precision pressing. Thus, the quantity incorporated is preferably less than or equal to 15 percent, more preferably less than or equal to 12 percent.

When the total quantity of $Nb_2O_5$, $WO_3$, and $TiO_2$ is greater than or equal to 35 percent, although a high refractive index and dispersion characteristics are achieved, the melted glass could develop color and devitrification stability could deteriorate. A total quantity of greater than or equal to 10 percent facilitates achieving the objects of optical characteristics such as a high refractive index and dispersion. Accordingly, the combined quantity of $Nb_2O_5$, $WO_3$, and $TiO_2$ is greater than or equal to 10 percent and less than 35 percent. The combined quantity of $Nb_2O_5$, $WO_3$, and $TiO_2$ is desirably greater than or equal to 15 percent and less than 35 percent preferably falling within a range of from 16 to 33 percent, and more preferably, within a range of 16 to 32 percent.

BaO is an essential component for increasing the refractive index, improving devitrification stability, and decreasing the liquid phase temperature of the glass. In particular, when a large quantity of $WO_3$ is incorporated, the incorporation of BaO has the effects of preventing coloration of the glass and enhancing devitrification stability. However, when the content of BaO exceeds 20 percent, the glass becomes thermally unstable and the sag point increases. Thus, the quantity of BaO introduced is desirably 20 percent or less, preferably falling within a range of from 0 to 18 percent.

ZnO is a component introduced to increase the refractive index and dispersion of the glass. The incorporation of a small quantity of ZnO has the effects of reducing the transition temperature, sag point, and liquid phase temperature of the glass. However, when an excessive quantity is incorporated, the devitrification stability of the glass deteriorates sharply and creates a risk that the liquid phase temperature will increase. Thus, the quantity incorporated is desirably less than or equal to 20 percent, preferably less than or equal to 18 percent.

Alkali metal oxides such as $Li_2O$, $Na_2O$, and $K_2O$ are components that are each incorporated to improve the devitrification resistance of the glass, decrease the sag point and liquid phase temperature, and improve the high-temperature melting characteristics of the glass. Thus, a 5 percent or greater quantity of $Li_2O$ is desirably incorporated. However, when $Li_2O$ and $Na_2O$ are each incorporated in a quantity exceeding 30 percent, or when $Li_2O$, $Na_2O$, and $K_2O$ are incorporated in a combined quantity exceeding 45 percent, the stability of the glass deteriorates and the object high refractive index and high dispersion characteristics become difficult to achieve. Thus, the quantities of $Li_2O$ and $Na_2O$ incorporated are each desirably less than or equal to 30 percent. The quantity of $K_2O$ incorporated is desirably less than or equal to 15 percent. Preferably, the quantity of $Li_2O$ falls within a range of 5 to 25 percent, that of $Na_2O$ within a range of 3 to 25 percent, and that of $K_2O$ within a range of 0 to 8 percent. The combined quantity of $Li_2O$, $Na_2O$, and $K_2O$ incorporated is desirably less than or equal to 45 percent.

An optional component, the addition of a suitable quantity of $Al_2O_3$ has the effects of increasing the viscosity of the glass at the liquid phase temperature and improving the chemical durability of the glass. However, when a quantity of $Al_2O_3$ exceeding 5 percent is incorporated, the glass tends not to melt and the sag point and liquid phase temperature increase. Thus, the incorporation of a quantity of less than or equal to 5 percent is desirable, with less than or equal to 4 percent being preferred.

$As_2O_3$ and $Sb_2O_3$ are effective glass refining agents. However, when either is added in a quantity exceeding 1 percent, the glass tends to bubble during precision pressing. Thus, the quantity incorporated is desirably less than or equal to 1 percent. Components such as $La_2O_3$, $Y_2O_3$, $Gd_2O_3$, $ZrO_2$, $Ta_2O_5$, CaO, MgO, and $Cs_2O$ may also be incorporated up to 5 percent so long as the object of the present invention is not defeated. However, from the perspective of obtaining quality glass optical elements, it is desirable not to incorporate these components. Further, since $Bi_2O_3$ tends to cause the glass to develop color, it is desirably not incorporated. When incorporated, the weight relative to the total glass composition is desirably kept to less than or equal to 4 percent.

It is desirable for the glass material employed in the present invention to essentially not comprise Ge, Te, and Pb. These components tend to reduce during the molding step, and Te and Pb are to be avoided due to environmental problems.

As starting materials for the glass material employed in the present invention, $H_3PO_4$, metaphosphates, diphosphorus pentoxide, and the like may be employed for $P_2O_5$; and $H_3BO_3$, $B_2O_3$, and the like may be employed for $B_2O_3$. Carbonates, nitrates, oxides, and the like may be suitably employed for the other components. In the present invention, these starting materials are weighed out in prescribed proportions and admixed to obtain a mixed starting material. This is then introduced into a melting furnace that has been heated to from 1,000 to 1,250° C. and melted, refined, and stirred. Following homogenization, the mixture is cast in a casting mold and gradually cooled to obtain a glass material suitable for precision pressing. Specifically, a prescribed quantity of glass melt flowing at a fixed rate from a nozzle is desirably received on a glass material mold and the glass material molded. The glass material is desirably molded while being floated on blown air above the glass material mold. The glass material is a high-refractive-index, high-dispersion glass material having a refractive index (nd) or greater than or equal to 1.65 and an Abbé number (vd) of less than or equal to 35.

This glass material is for use as the glass material (the preform employed in precision press molding) in precision press molding in a pressing mold having a carbon-based film on its molding surface.

In the present invention, the above-described glass material is heated to a temperature corresponding to a glass viscosity of from $10^5$ to $10^9$ dPaS and press molded with a pair of opposed pressing molds to manufacture glass optical elements. In this process, the pressing molds are heated to a temperature corresponding to a glass viscosity of from $10^8$ to $10^{12}$ dPaS. However, the case where the glass material has been heated to a temperature corresponding to $10^5$ dPaS and the pressing molds have been heated to a temperature corresponding to $10^8$ dPaS, and the case where the glass material has been heated to a temperature corresponding to $10^9$ dPaS and the pressing molds have been heated to a temperature of $10^{12}$ dPaS are excluded. Known methods and apparatuses may be employed for precision pressing. The conditions are suitably selected in light of the composition and physical properties of the glass.

A pressing mold 1 such as that shown in FIG. 1, for example, may be employed in the molding method of the present invention. In FIG. 1, pressing mold 1 comprises an upper mold 2, a lower mold 3, a sleeve 4, upper matrices 5 and 6, lower matrices 7 and 8, an upper mold lowering stop ring 9, and a spring 10. The upper mold, lower mold, and sleeve of the pressing mold may be, for example, made of silicon carbide, silicon, silicon nitride, tungsten carbide, aluminum oxide or titanium carbide cermet, or these materials the surface thereof is coated with diamond, heat-resistant metals, noble metal alloys, carbides, nitrides, borides, oxides, other ceramics, and the like. In particular, it is desirable to form a silicon carbide film by CVD on a silicon carbide sintered product, process it to finished shape, and then form a carbon-based film thereon. The carbon-based film of the present invention is a film containing carbon as primary component, and is desirably a carbon film comprising primarily an amorphous and/or crystalline graphite and/or diamond single component or mixed component layer. The primary component means the component which is included in 50% or more. This is to prevent fusion even when molding at a comparatively high pressing mold temperature and to permit ready mold release at comparatively high temperatures due to good mold release properties. The upper and lower matrices and ring can be made of metal, for example, and the spring can be made of ceramic. Pressing mold 1 is mounted within a press apparatus (not shown) equipped with a high-frequency coil, is heated by induction heating, and molding is conducted. The glass material being molded is heated on an arm, not shown, and then fed onto a lower mold 3 that has been heated to a prescribed temperature by induction heating by the high-frequency coil. Subsequently, the lower mold is raised or the upper mold is lowered to press the glass material being molded between the upper and lower molds and conduct molding.

The above-mentioned carbon-based film may be formed by a method such as sputtering, plasma CVD, CVD, ion plating, or the like. When the film is formed by sputtering, the base plate temperature is desirably from 250 to 600° C., the RF power density 5 to 15 W/cm$^2$, the degree of vacuum during sputtering is desirably from $5 \times 10^{-4}$ to $5 \times 10^{-1}$ Torr, the sputtering gas is desirably an inert gas such as Ar, and the sputtering target is desirably graphite. When the film is formed by microwave plasma CVD, a starting gas in the form of methane or hydrogen gas is desirably employed under conditions of a substrate temperature of from 650 to 1,000° C., a microwave power of from 200 W to 1 kW, and a gas pressure of from $10^{-2}$ to 600 Torr. When the film is formed by ion plating, the substrate temperature is desirably from 200 to 450° C. and benzene gas is desirably ionized. These carbon-based films comprise C—H bonds.

The deposition of a film by sputtering over an i-carbon film applied by ion plating is particularly desirable from the perspectives of mold release properties and durability of the molding surface. The thickness of the carbon-based film on the molding surface desirably falls within a range of from 5 to 200 nm.

The glass material of high-refractive-index, high-dispersion optical glass of the present invention may be, for example, in the form of spheres or elliptic spheres about 2 to 20 mm in diameter. The size and weight of the spheres or elliptic spheres are suitably determined in consideration of the size of the final product.

A carbon-based film is also desirably provided on the surface of the glass material employed in press molding. This is effective at improving sliding with the molding surface during press molding and mold release properties. The carbon-based film that is provided on the glass material may be formed by the thermal decomposition of a hydrocarbon gas such as acetylene, ethylene, butane, or ethane under conditions, for example, of a pressure of from 10 to 200 Torr and a thermal decomposition temperature of from 250 to 600° C. This carbon-based film also comprises C—H bonds.

Further, the carbon-based film on the surface of the glass material may be formed by vacuum vapor deposition. Known methods of vacuum vapor deposition may be employed. The carbon material is heated with an electron beam, direct current, or an arc in a vacuum atmosphere, and the carbon vapor evaporating and subliming out of the material is transported onto the base material and condensed and precipitated to form a thin carbon film. When employing direct current, for example, roughly 100 V, 50 A of electricity can be passed through a carbon material about 0.1 cm$^2$ in cross-sectional area to electrically heat the carbon material. The base material is desirably heated to a temperature of from room temperature to about 400° C. However, when the glass transition temperature (Tg) is less than or equal to 450° C., the upper limit to the temperature to which the base material can be heated is desirably made Tg minus 50° C. When the composition readily develops radial line marks, the vacuum vapor deposition method is desirably employed.

The carbon-based film on the surface of the glass material may be from 0.5 to 5 nm in thickness.

In the present invention, with the object of protecting the release film formed on the pressing mold, press molding is desirably conducted under a nonoxidizing atmosphere. An inert gas such as argon or nitrogen, a reducing gas such as hydrogen, or a mixture of such gases may be employed as the nonoxidizing atmosphere. Argon gas and argon gas mixed with a small quantity of nitrogen are preferred.

The steps of the manufacturing method of the present invention will be described below for the case where the molding apparatus of FIG. 1 is employed.

(a) Heating Step

Upper mold 2 and lower mold 3 are heated to prescribed temperatures by a heating means (not shown) such as a high-frequency induction coil.

(b) Feeding Step

A glass material that has been heated to a prescribed temperature and transported is fed between the heated upper and lower molds and positioned on the lower mold.

(c) Press Molding Step

With the glass material having been softened by heating, the lower mold is raised to press the glass material between the upper and lower molds. The shape of the molding surfaces of the upper and lower molds are transferred to mold a glass optical element of specified surface shape.

(d) Cooling and Mold Release Step

The upper and lower molds are cooled to a prescribed temperature and the lower mold is lowered to separate the upper and lower molds. Subsequently, the glass optical element is released from the mold.

(e) Taking Out Step

The molded glass member is taken out.

Optical elements are continuously manufactured by repeating above-stated steps (a) to (e).

In heating step (a), the upper and lower molds are heated by a heating means so that they reach predetermined upper and lower mold temperatures. The temperatures of the upper and lower molds to which they are heated in the heating step may be identical for both upper and lower molds, or a difference in temperature may be set. For example, based on the shape and diameter of the optical element being molded, the lower mold may be made hotter than the upper mold, or the lower mold may be made cooler than the upper mold. In these cases, both the temperatures of the upper and lower molds are set within the temperature range of the present invention. When there is a difference in temperature between the upper and lower molds, it desirably falls within a range of from 2 to 15° C.

The upper and lower molds that have conducted the (e) taking out step of the previous cycle are cooled to a temperature close to Tg. The upper and lower molds are then heated to a setting temperature suited to the next cycle of molding.

In glass material feeding step (b), glass material that has been preliminarily formed to a prescribed shape of suitable weight is softened by heating to a viscosity suited to molding and then fed. The method of introducing into the mold a glass material at a temperature higher than that of the mold shortens the molding cycle time and is thus extremely advantageous.

When the softened glass is being conveyed into position on the lower mold, the glass material contacts the conveying member, tending to cause defects in the surface and affecting the surface shape of the molded optical element. Thus, the softened glass material can be transported while floating on a gas using a jig that then drops the glass material onto the lower mold.

In press molding step (c), immediately after the glass material has been fed, that is, while the upper and lower molds and the glass material are each still within their prescribed temperature ranges, the lower mold is moved to press the glass material. The pressing stroke of the lower mold is a value that is preset based on the thickness of the optical element being molded, and may be set in estimation of the amount of thermal contraction of the glass during the subsequent cooling step. The rate of press molding is desirably from 3 to 600 mm/min. For a lens greater than or equal to 15 mm in diameter, a rate of from 3 to 80 mm/min is desirable. The pressing schedule can be set as desired based on the shape and size of the optical element being molded. Following the initial pressing, once the load has been released, a second pressing or multiple pressing cycles may be employed.

In cooling and mold release step (d), while continuing pressing, or after having reduced the pressure, the optical element that has been molded is kept in close contact with the mold. After having cooled to a prescribed temperature, it is released from the mold. Starting of cooling after press molding is made to a thickness established in estimation of the amount of thermal contraction as set forth above effectively prevents cracking. Further, the average value of the cooling rate from the start of cooling to release from the mold can be set to 50 to 200° C./min to prevent cracking and radial line marks. A cooling rate at the start of cooling that is lower than the average cooling rate is desirable from the perspective of preventing cracks, and the cooling rate is desirably increased to close to the mold release temperature. The mold release temperature can be set to close to Tg based on the viscosity of the glass, and is desirably set to Tg minus 30° C. or less.

During taking out step (e), the optical element is automatically taken out by a recovery arm or the like (not shown) equipped with a suction member.

The shape of the optical element that is press molded in the present invention is not specifically limited. The manufacturing method of the present invention is suited to the formation of biconvex lenses, convex meniscus lenses, concave meniscus lenses, biconcave lenses, and the like. The size of the optical element is not specifically limited, but a diameter of from about 2 mm to about 35 mm is desirable. At 2 mm or less, the glass material tends to cool and develop cracks. At 35 mm and above, time is required for molding and it becomes extremely difficult to obtain good surfaces. The shape of the optical element may be spherical, aspherical, or some combination thereof.

The time required to heat the glass material and pressing molds and to conduct press molding and cooling (the cycle time) varies with the size and shape of the optical element, but is desirably from about 60 sec to about 300 sec. At less than 60 sec, it becomes necessary to increase the temperature at which molding is conducted and accelerate cooling, sometimes resulting in a tendency for radial line marks and cracks to develop. When 300 sec are exceeded, manufacturing efficiency tends to decrease.

The pressure during molding is suitably set based on the thickness and surface shape of the optical element being molded. For convex lenses that are relatively easy to mold, molding is suitable conducted with a load of from about 50 to 250 kg/cm². For optical lenses that are difficult to mold, pressing is desirably first conducted to a prescribed thickness at a load of from about 50 to 250 Kg/cm², after which pressing is conducted again at a load of from 20 to 150 Kg/cm² to obtain adequate surface precision.

EXAMPLES

Examples of the present invention are described below.

Example 1

The example of forming a concave meniscus lens 11 mm in diameter with a center thickness of 1.2 mm will be described. Glass (Tg: 478° C., Ts: 527° C.) with a composition comprising 24 percent $P_2O_5$, 4 percent $B_2O_3$, 20 percent $Li_2O$, 13 percent $Na_2O$, 1 percent $K_2O$, 4 percent BaO, 2 percent ZnO, 5 percent $TiO_2$, 20 percent $Nb_2O_5$, and 7 percent $WO_3$ was molded into an oblate spherical shape 10 mm in diameter with a volume of 420 mm³ to obtain a glass material (preform) for pressing. The refractive index (nd) of the preform obtained was 1.828 and the Abbé number (vd) was 23.8. A carbon film (2 nm in thickness) was formed by acetylene decomposition on the surface of the preform. The preform was heated to various temperatures at which the viscosity ranged from $10^4$ to $10^{10}$ dPaS and fed into a lower mold that had been heated to various temperatures corresponding to glass viscosities of $10^7$ to $10^{13}$ dPaS. The lower mold was immediately raised to press the preform between the lower mold and an upper mold heated to the same temperature. Carbon-based release films (40 nm in thickness) had been formed by sputtering on the surfaces of the upper and lower molds in advance. All steps were conducted in a nonoxidizing atmosphere under a nitrogen gas flow. The initial pressure during pressing was from 100 to 150 kg/cm$^2$, after which the pressure was lowered to from 50 to 90 kg/cm$^2$ to achieve good surface precision. Separation from the mold was conducted when the temperature reached 430° C., and the lens was taken out.

FIG. 2 shows the temperatures of the preform and molds when the preform was fed, the glass viscosities corresponding to those temperatures, and evaluation results for the lenses obtained by press molding.

Since deformation by pressing was slower when the mold temperature and/or preform temperature was low, a tendency was observed for the time required to reach a desired thickness to increase. There were also cases where adequate deformation did not take place, extension failed, and cracking occurred due to excessive deformation. In addition, when the mold temperature and/or preform temperature was high, deformation due to pressing occurred rapidly. However, as the temperature increased, pitlike defects (radial line marks) radiating from the center of the lens formed. At even higher temperature ranges, bubbles formed.

These results confirmed that good lenses were obtained by setting the preform heating temperature to within a range corresponding to a glass viscosity of from $10^6$ to $10^8$ dPaS, feeding the preform to a lower mold that had been heated to a temperature corresponding to a glass viscosity of from $10^9$ to $10^{11}$ dPaS, and conducting press molding.

Further, under conditions where the preform temperature was decreased to a temperature corresponding to ten times ($10^9$ dPaS) the above viscosity or the mold temperature was increased to a temperature corresponding to ten times ($10^{12}$ dPaS) the above viscosity of the glass, deformation by pressing became slightly difficult, but no problems occurred. By contrast, when the preform temperature was increased to a temperature corresponding to one-tenth ($10^5$ dPaS) the above-stated viscosity or the mold temperature was decreased to a temperature corresponding to one-tenth ($10^8$ dPaS) of the above viscosity, slight radial line marks formed, but did not impede use of the product.

Example 2

The example of forming a convex meniscus lens 14 mm in diameter with a center thickness of 2.5 mm will be described. Glass (Tg: 446° C., Ts: 488° C.) with a composition comprising 28 percent $P_2O_5$, 5 percent $B_2O_3$, 10 percent $Li_2O$, 29 percent $Na_2O$, 5 percent ZnO, 5 percent $TiO_2$, 9 percent $Nb_2O_5$, and 9 percent $WO_3$ was molded into the shape of an oblate spherical shape 11 mm in diameter with a volume of 450 mm$^3$ to obtain a preform. The refractive index (nd) of the preform obtained was 1.689 and the Abbé number (vd) was 31.4. The preform was heated to within a temperature range at which the viscosity ranged from $10^4$ to $10^{10}$ dPaS and fed into a lower mold that had been heated to a temperature corresponding to a glass viscosity of $10^7$ to $10^{13}$ dPaS. The lower mold was immediately raised to press the preform between the lower mold and an upper mold. The pressure during pressing was from 100 to 150 kg/cm$^2$. The carbon film on the preform, pressing mold, molding chamber atmosphere, and the like were identical to those in Example 1.

FIG. 3 shows the temperatures of the preform and molds, the glass viscosities corresponding to those temperatures, and evaluation results for the lenses obtained by press molding.

Since deformation by pressing was slower when the mold temperature and/or preform temperature was low, a tendency was observed for the time required to reach a desired thickness to increase. There were also cases where adequate deformation did not take place, extension failed, and cracking occurred due to excessive deformation. In addition, when the mold temperature and/or preform temperature were high, deformation due to pressing occurred rapidly. However, as the temperature increased, pitlike defects (radial line marks) radiating from the center of the lens formed. At even higher temperature ranges, bubbles formed.

These results confirmed that good lenses were obtained by setting the preform heating temperature to within a range corresponding to a glass viscosity of from $10^6$ to $10^8$ dPaS, feeding the preform to a lower mold that had been heated to a temperature corresponding to a glass viscosity of from $10^9$ to $10^{11}$ dPaS, and conducting press molding.

Further, under conditions where the preform temperature was decreased to a temperature corresponding to ten times ($10^9$ dPaS) the above viscosity or the mold temperature was decreased to a temperature corresponding to ten times ($10^{12}$ dPaS) the above viscosity of the glass, deformation by pressing became slightly difficult, but no problems occurred. By contrast, when the preform temperature was increased to a temperature corresponding to one-tenth ($10^5$ dPaS) the above-stated viscosity or the mold temperature was decreased to a temperature corresponding to one-tenth ($10^8$ dPaS) of the above viscosity, slight radial line marks formed, but did not impede use of the product.

Examples 3–13

Press molding tests identical to those of Examples 1 and 2 were conducted for 11 compositions of glass falling within the range of the present invention. As a result, it was found that as Ts rose, and as $C_H$ increased, there was a tendency for radial line marks to occur in the high temperature range. However, within the same glass viscosity ranges as in Examples 1 and 2, good lenses were obtained without cracking, defective extension, radial line marks, or bubbling (Tables 1 and 2).

Examples 14–15

Press molding tests conducted on two glass compositions containing $SiO_2$ and falling within the range of the present invention revealed that good lenses could be obtained in the same manner as in Examples 1–13 (Tables 1 and 2).

Comparative Examples 1–3

Press molding tests were conducted on three glass compositions falling outside the range of the present invention under the same conditions as in Examples 1 and 2. As a result, cracking, defective extension, or radial line marks occurred. The glass viscosity range over which good lenses were obtained was narrow and stable production proved difficult (Tables 1 and 2).

The refractive index (nd), Abbé number (vd), sag point (Ts), transition temperature (Tg), and liquid phase temperature (L.T.) were measured as follows.

(1) Refractive Index (nd) and Abbé Number (vd):

They were measured for preforms obtained with a gradual cooling temperature lowering rate of −30° C./h.

(2) Sag Point (Ts) and Transition Temperature (Tg):

They were measured for a temperature increase rate of 4° C./min with a thermomechanical analyzer made by Rigaku Denki K. K.

(3) Liquid Phase Temperature (L.T.):

The liquid phase temperature was measured by maintaining the sample for one hour in a devitrification test furnace having a 400 to 1,150° C. temperature gradient and observing by microscope at 80-fold magnification whether or not crystals were present.

TABLE 1

| | mol % | | | | | | | | | | | | | | |
|---|---|---|---|---|---|---|---|---|---|---|---|---|---|---|---|
| | $P_2O_5$ | $B_2O_3$ | $SiO_2$ | $Al_2O_3$ | $Li_2O$ | $Na_2O$ | $K_2O$ | BaO | ZnO | CaO | $TiO_2$ | $ZrO_2$ | $Nb_2O_5$ | $WO_3$ | Total |
| Example 3 | 24.4 | 3.8 | 0.0 | 0.0 | 19.4 | 13.6 | 1.9 | 5.5 | 1.5 | 0.0 | 4.7 | 0.0 | 16.5 | 8.9 | 100.0 |
| Example 4 | 27.1 | 5.0 | 0.0 | 0.0 | 12.5 | 28.9 | 0.0 | 0.0 | 0.0 | 0.0 | 2.7 | 0.0 | 7.4 | 16.4 | 100.0 |
| Example 5 | 27.5 | 4.7 | 0.0 | 2.3 | 9.7 | 28.9 | 0.0 | 0.0 | 6.2 | 0.0 | 5.1 | 0.0 | 10.3 | 5.3 | 100.0 |
| Example 6 | 28.1 | 4.7 | 0.0 | 1.8 | 9.8 | 29.1 | 0.0 | 0.0 | 4.7 | 0.0 | 5.7 | 0.0 | 10.1 | 5.8 | 100.0 |
| Example 7 | 24.0 | 3.0 | 0.0 | 0.0 | 22.0 | 11.0 | 2.0 | 3.0 | 3.0 | 0.0 | 6.0 | 0.0 | 18.0 | 8.0 | 100.0 |
| Example 8 | 24.0 | 5.0 | 0.0 | 0.0 | 20.0 | 11.0 | 2.0 | 6.0 | 1.0 | 0.0 | 5.0 | 0.0 | 21.0 | 5.0 | 100.0 |
| Example 9 | 23.0 | 5.0 | 0.0 | 0.0 | 18.0 | 14.0 | 2.0 | 4.0 | 2.0 | 0.0 | 6.0 | 0.0 | 19.0 | 7.0 | 100.0 |
| Example 10 | 24.0 | 5.0 | 0.0 | 0.0 | 21.0 | 13.0 | 2.0 | 3.0 | 1.0 | 0.0 | 5.0 | 0.0 | 21.0 | 5.0 | 100.0 |
| Example 11 | 23.9 | 4.0 | 0.0 | 0.0 | 17.9 | 13.9 | 2.0 | 5.0 | 1.0 | 0.0 | 5.0 | 0.0 | 22.4 | 5.0 | 100.0 |
| Example 12 | 24.0 | 4.0 | 0.0 | 0.0 | 17.0 | 15.0 | 2.0 | 5.0 | 1.0 | 0.0 | 5.0 | 0.0 | 23.0 | 4.0 | 100.0 |
| Example 13 | 24.0 | 4.0 | 0.0 | 0.0 | 17.7 | 12.3 | 2.0 | 4.0 | 4.0 | 0.0 | 6.0 | 0.0 | 19.0 | 7.0 | 100.0 |
| Example 14 | 0.0 | 20.0 | 21.9 | 0.0 | 0.0 | 10.0 | 10.0 | 3.4 | 0.0 | 1.5 | 12.2 | 3.1 | 14.8 | 3.1 | 100.0 |
| Example 15 | 0.0 | 19.7 | 21.5 | 0.0 | 0.0 | 9.8 | 9.8 | 3.4 | 0.0 | 1.5 | 12.0 | 3.0 | 13.1 | 6.1 | 100.0 |
| Comp. Example 1 | 22.8 | 7.6 | 0.0 | 0.0 | 0.0 | 22.3 | 0.0 | 16.2 | 0.0 | 0.0 | 0.0 | 0.0 | 15.9 | 15.2 | 100.0 |
| Comp. Example 2 | 23.6 | 5.9 | 0.0 | 0.0 | 7.3 | 12.9 | 2.2 | 15.2 | 0.0 | 0.0 | 7.8 | 0.0 | 23.3 | 1.9 | 100.1 |
| Comp. Example 3 | 24.64 | 8.21 | 0.0 | 0.0 | 8.21 | 15.97 | 0.0 | 17.52 | 0.0 | 0.0 | 0.0 | 0.0 | 25.46 | 0.00 | 100.0 |

TABLE 2

| | Ts (° C.) | Tg (° C.) | LT (° C.) | $C_H = \Sigma$ (TiNbW) (mol %) | nd | vd | Press results |
|---|---|---|---|---|---|---|---|
| Example 3 | 514.0 | 472 | 870 | 30.1 | 1.795 | 25.6 | Good |
| Example 4 | 477.0 | 435 | 800 | 26.5 | 1.691 | 31.3 | Good |
| Example 5 | 500.0 | 448 | 780 | 20.7 | 1.686 | 31.7 | Good |
| Example 6 | 500.0 | 455 | 800 | 21.7 | 1.687 | 31.4 | Good |
| Example 7 | 512.8 | 467 | 900 | 32.0 | 1.821 | 24.0 | Good |
| Example 8 | 531.8 | 482 | 930 | 31.0 | 1.828 | 24.0 | Good |
| Example 9 | 519.9 | 471 | 910 | 32.0 | 1.823 | 23.9 | Good |
| Example 10 | 525.6 | 478 | 920 | 31.0 | 1.823 | 23.9 | Good |
| Example 11 | 535.3 | 484 | 940 | 32.3 | 1.837 | 23.4 | Good |
| Example 12 | 539.7 | 490 | 940 | 32.0 | 1.836 | 23.4 | Good |
| Example 13 | 525.4 | 475 | 920 | 32.0 | 1.827 | 23.7 | Good |
| Example 14 | 565.0 | 514 | 1090 | 30.1 | 1.815 | 24.5 | Good |
| Example 15 | 556.0 | 506 | 1080 | 31.2 | 1.807 | 25.0 | Good |
| Comp. Example 1 | 580.0 | | | 31.1 | 1.801 | 26.7 | Defective |
| Comp. Example 2 | 590.0 | | | 33.0 | | | Defective |
| Comp. Example 3 | 591.0 | | | 25.46 | 1.838 | 25.2 | Defective |

Good: Cracking, defective extension, radial line marks, and bubbling were not observed within the temperature range of glass material corresponding to a glass viscosity of from $10^5$ to $10^9$ dPaS and the temperature range of pressing mold corresponding to a glass viscosity of from $10^8$ to $10^{12}$ dPaS (excluding the case where the glass material has been heated to a temperature corresponding to $10^5$ dPaS and the pressing mold has been heated to a temperature corresponding to $10^8$ dPaS, and the case where the glass material has been heated to a temperature corresponding to $10^9$ dPaS and the pressing mold has been heated to a temperature of $10^{12}$ dPaS).

Defective: Bubbling was observed within the above temperature range and the products did not satisfy the product specification.

Based on the manufacturing method of the present invention, glass optical elements exhibiting high refractive indexes and high dispersion can be obtained without using glass materials containing environmentally unsound components and components that damage the pressing mold. Further, based on the manufacturing method of the present invention, press molding is possible without deterioration or line marks of the pressing mold. Further, high-precision glass optical elements can be obtained without defective extension, cracking, radial line marks, or bubbling during molding. This is particularly important in the molding of precision lenses that are not ground or polished following molding.

The present disclosure relates to the subject matter contained in Japanese Patent Application No. 2002-070781 filed on Mar. 14, 2002, which is expressly incorporated herein by reference in its entirety.

What is claimed is:

1. A method of manufacturing glass optical elements with a pair of opposed pressing molds, comprising:

heating a glass material to a temperature corresponding to a glass viscosity of from $10^5$ to $10^9$ dPaS so that the glass material is softened, press molding the glass material with the pressing molds which are heated to a temperature corresponding to a glass viscosity of from $10^8$ to $10^{12}$ dPaS, wherein the glass material comprises at least one selected from the group consisting of $Nb_2O_3$, $WO_3$, and $TiO_2$ and has a refractive index nd of greater than or equal to 1.65, an Abbè number (vd) of less than or equal to 35, and a sag point (Ts) of less than or equal to 570° C., provided that the glass material is not heated to a temperature as high as that corresponding to a glass viscosity of $10^5$ dPaS when the pressing mold is heated to a temperature corresponding to a glass viscosity of $10^8$ and that the glass material is not heated to a temperature as low as that corresponding to a glass viscosity of $10^9$ dPaS when the pressing mold is heated to a temperature corresponding to a glass viscosity of $10^{12}$ dPaS, and that the press molding is carried out when the temperature of the glass material is 580° C. or lower.

2. The method of claim 1 wherein the glass material further comprises at least one selected from the group consisting of $P_2O_5$, $SiO_2$, and $B_2O_3$, and the sum of the contents of $Nb_2O_3$, $WO_3$, and $TiO_2$, denoted as $C_H$, satisfies the condition of $0<C_H<35$ in molar percent.

3. The method of claim 2 wherein the glass material is heated to a temperature corresponding to a glass viscosity of from $10^6$ to $10^8$ dPaS.

4. The method of claim 3 wherein the pressing molds are heated to a temperature corresponding to a glass viscosity of from $10^9$ to $10^{11}$ dPaS.

5. The method of claim 4 wherein the glass material comprises, in molar percentage,

| | |
|---|---|
| $P_2O_5$ | 15–40 percent, |
| $SiO_2$ | 0–10 percent, |
| $B_2O_3$ | 0–20 percent, |
| $Al_2O_3$ | 0–5 percent, |
| $Li_2O$ | 5–30 percent, |
| $Na_2O$ | 0–30 percent, |
| ZnO | 0–20 percent, |
| BaO | 0–20 percent, |
| $Nb_2O_5$ | 2–30 percent, |
| $WO_3$ | 2–15 percent, and |
| $TiO_2$ | 0–15 percent | where the total amount of $NbO_2$, $WO_3$, and $TiO_2$ is greater than or equal to 10 percent and less than 35 percent and the total amount of the above listed components is greater than or equal to 95 percent.

6. The method of claim 5 wherein the press molding is conducted in a non-oxidizing atmosphere.

7. The method of claim 6 wherein the glass material is coated with a film comprising carbon.

8. The method of claim 1 wherein the press molding is carried out when the temperature of pressing molds is 530° C. or lower.

9. The method of claim 8 wherein the press molding is carried out when the temperature of the pressing molds is 510° C. or lower.

10. The method of claim 1 wherein each of the pressing molds comprises a film comprising carbon on a molding surface.

11. The method of claim 2 wherein the sum of the contents of $Nb_2O_3$, $WO_3$, and $TiO_2$, denoted as $C_{H1}$ satisfies the condition of $0<C_{H1}<32$ in molar percent.

12. The method of claim 1 wherein content of $WO_3$ denoted by Cw in molar percent satisfies the condition of $Ts+7Cw<610$.

13. The method of claim 1 wherein content of $WO_3$ denoted by Cw in molar percent satisfies the condition of $Ts+6Cw<590$.

14. The method of claim 1 wherein content of $WO_3$ denoted by Cw in molar percent satisfies the condition of $Ts+6Cw<580$.

15. The method of claim 1 wherein the sag point of the glass material is 540° C. or lower.

16. The method of claim 1 wherein a rate for press molding is from 3 to 600 mm/min.

17. The method of claim 1 wherein press molding of the glass material is carried out with a pressing mold that is heated to a temperature lower than the heated glass material.

* * * * *